United States Patent [19]

Sawano et al.

[11] Patent Number: 5,060,222
[45] Date of Patent: Oct. 22, 1991

[54] METHOD OF OVERWRITING INFORMATION ON RECORDING MEDIUM

[75] Inventors: Mitsuru Sawano; Toshiaki Igata; Younosuke Takahashi, all of Shizuoka, Japan

[73] Assignee: Fuji Photo Film Co., Ltd., Minami-ashigara, Japan

[21] Appl. No.: 338,043

[22] Filed: Apr. 14, 1989

[30] Foreign Application Priority Data

Apr. 14, 1988 [JP] Japan .................................. 63-92796

[51] Int. Cl.$^5$ ................................................ G11B 7/00
[52] U.S. Cl. ..................................... 369/100; 369/121
[58] Field of Search ............... 369/100, 121, 119, 101, 369/275; 365/113

[56] References Cited

U.S. PATENT DOCUMENTS 4,860,274 8/1989 Kobayashi ........................... 369/100

FOREIGN PATENT DOCUMENTS 0081631 12/1988 Japan ..................................... 369/121
0081632 12/1988 Japan ..................................... 369/121

Primary Examiner—Roy N. Envall, Jr.
Assistant Examiner—Thang V. Tran
Attorney, Agent, or Firm—Sixbey, Friedman, Leedom & Ferguson

[57] ABSTRACT

A method of optically writing an information over an information recorded on a recording material which is reversively convertible between a stable phase and a metastable phase to show different light reflection or transmission by controlling a heating condition to be applied to the recording material wherein the recorded information is recorded in the form of a plurality of separated metastable-phase areas on a stable-phase area is disclosed. One method comprises two steps of erasing the recorded information by intermittently irradiating the plurality of metastable areas with a laser beam which gives such a high thermal energy to the recording material at least at its central area of a beam spot formed on the recording material as to be able to convert the metastable phase into the stable phase under the condition that the central area of one beam spot is formed on the recording material in an area overlaping with an area of a central high thermal energy area of a laser beam spot having been formed by the preceding irradiation to convert a metastable phase into a stable phase and then recording another information in the recording material by irradiating the recording material with a laser beam to form a plurality of separated metastable-phase areas. Another method comprises a single process for erasing a recorded information, at a desired moment in the course of which a fresh information is recorded by prolonging interval between two laser beam irradiations.

6 Claims, 2 Drawing Sheets

MOVEMENT OF LASER BEAM

MOVEMENT OF LASER BEAM

MOVEMENT OF LASER BEAM

MOVEMENT OF LASER BEAM

MOVEMENT OF LASER BEAM

METHOD OF OVERWRITING INFORMATION ON RECORDING MEDIUM

BACKGROUND OF THE INVENTION

1. Filed of the Invention

The present invention relates to a novel method of overwriting an information on a recording material by the use of a laser beam of high-energy density.

2. Description of Prior Art

Information recording media utilizing a beam of high energy density such as a laser beam have been developed in recent years and now are put to practical use. Such recording medium is called an optical disc and its practical applications have been found, for example, as a video disc and an audio disc as well as a disc memory for a large-capacity computer, a large-capacity static image file, an optical card, a micro-image recording medium, a supermicro-image recording medium, a micro-facsimile and a negative for photographic typesetting.

The optical disc basically comprises a disc-shaped transparent substrate of plastic or glass material and a recording layer provided on the substrate. As materials of the recording layer, that is, recording materials, there are known a metal such as Bi, Sn, In or Te, a semimetal, and a dye such as cyanine dye, metal complex dye or quinone dye.

Writing (or Recording) of information on the optical disc is conducted, for example, by irradiating a rotating optical disc with a laser beam. Under irradiation with the laser beam, the irradiated area of the recording layer of the optical disc absorbs energy of the beam and a rise in temperature locally occurs, and as a result chemical or physical change (such as formation of a pit) is caused to alter (or change) optical characteristics of the recording layer in the irradiated area, whereby the information can be recorded. The alteration of optical characteristics can be done through formation of pits or protruded portions on the surface of the recording layer or formation of bubbles in the recording layer. The recording of information utilizing the formation of pits is widely adopted. Further, a method of utilizing a reaction between two materials in the recording layer is also used.

Reading (or reproduction) of information from the optical disc is conducted by irradiating the optical disc with a laser beam. The information can be reproduced by detecting reflected light or transmitted light corresponding to the local change of the optical characteristics of the recording material.

Generally, the above-mentioned system for recording and reproducing an information cannot be repeated in one recording medium. In other words, an information recorded in the recording medium can be reproduced repeatedly but cannot be erased for recording of another information thereon. This is because the recording material of such recording medium cannot be converted reversibly.

Erasure of information for another recording (i.e., overwriting) on the optical disc can be done only in the case that the information is recorded through reversible change of the recording material. Such recording medium is named an erasable recording medium. In the medium of this type, information is generally recorded, erased and recorded through reversible change of the phase condition (i.e., phase change), such as change between a crystalline phase and an amorphous phase, change between a homogeneous clear (transparent) phase and a phase-separated turbid phase, or change between a regularly oriented crystalline phase and an irregularly oriented crystalline phase.

Overwriting of information in the erasable recording medium can be done by a two stage procedure or a one stage procedure. The former two stage procedure comprises a separated two stages, that is, a stage for erasing a recorded information from the recording medium and a stage for recording (writing) a fresh information on the recording medium having been subjected to the above erasing stage. The latter one stage procedure comprises an erasing operation and a recording operation which is inserte in the erasing operation at appropriate times.

Recording of information on an optical disc according to a known two stage procedure is done, for instance, by initially heating the recording layer to crystallize the whole surface of the layer and then irradiating the crystalline recording layer of the optical disc under rotation intermittently with a laser beam of high power to form on the recording layer a series of plural separated amorphous areas corresponding to digital signals of the information. Thus, the information is recored on the recording layer. Erasure of the recorded information is done by irradiating areas including the amorphous areas of the recording layer of the disc under rotation continuously with a laser beam having a thermal energy lower than that of the laser beam used in the recording procedure to convert the amorphous phase areas into crystalline phase areas. Thus, the information-erased recording layer of the optical disc now has a crystalline phase in its whole area. Recording of another (fresh) information on the erased recording layer can be done in the manner as described above for the first recording.

The above-described two-stage overwriting procedure is disadvantageous in that satisfactory erasure is sometimes not achieved in the erasing operation. This is explained in detail by referring to FIGS. 1 and 2 in the attached drawings. FIG. 1 is a shematic view of a recording layer having received irradiation of a laser beam in the recording operation.

When the recording layer is irradiated with a laser beam of a high power in the recording operation, the recording material in the irradiated area 1 (i.e., irradiated spot) absorbs high thermal energy of the laser beam to melt instantly. Subsequently the irradiation of laser beam is stopped and then the irradiation is again applied to an area 1' which is arranged ajacently to the melted area 1 with a certain space. In the course of the above procedure, the melted area 1 is rapidly cooled just after the irradiation is stopped, and turns not to the original stable crystalline phase area but to a metastable amorphous phase area. By the formation of a series of the metastable amorphous phase areas, the desired information is recorded in a set of digital siganals. It has been noted that a recrystallized area 2 is incidentally produced around the formed amorphous area (recorded area) 1 because the area 2 around the recorded area 1 is also heated up to a temperature below the melting point of the recording material of the layer but above the recrystallization temperature (or phase-transition temperature). The condition of the recrystallized area 2 is different from that of the crystalline background area 3. Accordingly, when the recording operation is complete, the recording layer has the background crystalline area 3 and the information-recorded amorphous area 1, as well as another crystalline area 2 which differs from the background crystalline area S in its crystalline conditions.

FIG. 2 is a schematic view of the recording layer of FIG. 1 after being subjected to the erasing operation.

In the erasing operation, the recording layer is irradiated with a laser beam of a relatively low power to continuously scan to trace a route which is so predetermined as to connect the information-recorded amorphous areas. The continuous belt 4 of FIG. 2 shows a track of spots of the scanned laser beam. After the erasing operation using the low power laser beam is complete, the area of belt 4 turns into the orginal cystalline phase area but the areas 2a, 2b are left having the different crystalline condition. Therefore, thus erased recording layer has two kinds of different crystalline areas which are slightly different in the optical characteristics. The presence of such different phase areas in the information erased recording layer sometimes causes error or failure of the following recording, reproduction or other operations.

To solve the above-mentioned problem, a one-stage overwriting procedure using a single laser beam has been proposed. According to the procedure, the erasure is done by continuously applying a laser beam of high power onto an information-recorded recording layer. In the course of this operation, the recording material in the amorphous phase area as well as in the two kinds of the crystalline phase areas is similarly melted to turn into a homogeneous crystalline phase area. When the laser beam reaches a position where a new information is to be recorded, the power of the laser beam is instantly lowered to make the recording material at the position amorphous. In this manner, the one-stage overwriting (combination of erasure of a recorded information and subsequent recordal of another information) can be attained using a single laser beam. According to this method, the problem of production of different crystalline phase area is obviated. However, since the recording layer has to be continuously irradiated with the laser beam of high power, irreversible change is apt to occur in the recording layer due to deterioration of the recording material. The occurrence of such irreversible change may cause increase of read-out error after the overwriting procedure is repeatedly performed.

As another method, a pseudo-overwriting method has been proposed. This method uses two laser beams simultaneously, in which erasure is done with an elliptic beam and writing is done with a circular beam. There are disadvantages that a conventional optical head of writeonly-type cannot be used due to necessity of a set of two beams and that adjustment such as positional adjustment between two beams is not easy.

SUMMARY OF THE INVENTION

It is an object of the present invention to provide a novel method of writing on an information-recorded recording layer of an erasable recording material another information.

It is another object of the invention to provide a novel overwriting method which can obviate the remaining of different plural stable phases on the recording area after erasure is complete and also can obviate deterioration of an erasable recording material.

It is a further object of the invention to provide a two-stage overwriting method comprising an erasing stage and a recording stage, both of which are independently done of each other.

It is a further object of the invention to provide a one-stage overwriting method comprising an erasing stage and a recording operation which is performed somewhere in the progress of the erasing procedure which is almost free from deterioration of an erasable recording material.

There is provided by the present invention a separated two-stage method of optically writing an information over an information recorded on a recording material which is reversively convertible between a stable phase and a metastable phase to show different light reflection or transmission by controlling a heating condition to be applied to the recording material, said recorded information being recorded in the form of a plurality of separated areas of the metastable phase in the recording material of the stable phase which comprises the steps of:

intermittently irradiating the plurality of separated areas of metastable phase of the recording material with a laser beam which gives such a high thermal energy to the recording material at least at its central area of a beam spot formed on the recording material as to be able to convert the metastable phase into the stable phase under the condition that the central area of one beam spot is formed on the recording material in an area overlaping with an area of a central high thermal energy area of a laser beam spot having been formed by the preceding irradiation to convert the metastable phase into the stable phase, whereby the recorded information is erased; and subsequently recording another information in the recording material by irradiating the recording material with a laser beam to form a plurality of separated areas of the metastable phase in the recording material.

Also provided by the invention is a single stage method of optically writing an information over an information recorded on a recording material which is reversively convertible between a stable phase and a metastable phase to show different light reflection or transmission by controlling a heating condition to be applied to the recording material, said recorded information being recorded in the form of a plurality of separated area of the metastable phase in the recording material of the stable phase which comprises a combination of a process for continuously erasing the recorded information and stages for writing another information on the recording material, said writing stage being executed in the course of the erasing process, wherein:

said erasing process comprises intermittently irradiating the plurality of separated areas of metastable phase of the recording material with a laser beam which gives such a high thermal energy to the recording material at least at its central area of a beam spot formed on the recording material as to be able to convert the metastable phase into the stable phase under the condition that the central area of one beam spot is formed on the recording material in an area overlaping with an area of a central high thermal energy area of a laser beam spot having been formed by the preceding irradiation to convert the metastable phase into the stable phase, whereby the recorded information is erased; and said writing stage comprises intermittently irradiating the recording layer with said laser beam under the condition that the central area of one beam spot is formed on the recording material in an area not overlapping with an area of a central high thermal energy area of a laser beam spot having been formed by the preceding irradiation to form the metastable phase in the recording material.

In the former two-stage method, the laser beam used in the step of recording another information is preferably emitted by a source of the laser beam used in the step of erasing information information, and more preferably the laser beam used in the step of recording another information has the sam thermal energy as the laser beam used in the step of erasing information information.

DETAILED DESCRIPTION OF THE INVENTION

Figure 1:
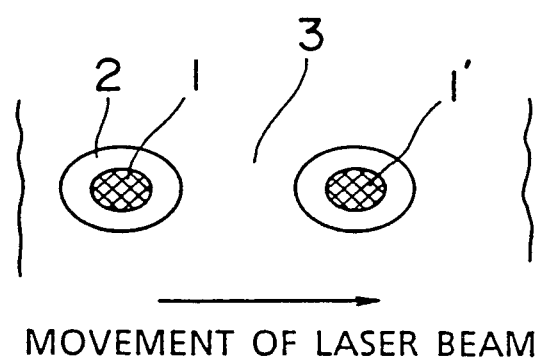
FIG. 1 is a schematic view showing a recorded state on a surface of a recording material on which information is recorded in a known way.
Figure 2:
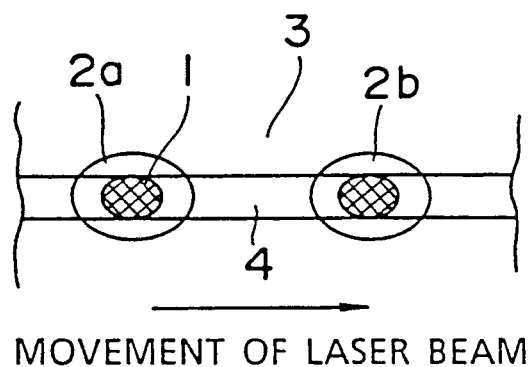
FIG. 2 is a schematic view showing an erased state on a surface of a recording material from which the recorded information is erased in a known way.

The erasing procedure of the two-stage method can be performed, for instance, by a method which comprises irradiating the recording material under rotation with a laser beam having an energy capable of melting the recording material intermittently at a period shorter than the length of a high thermal energy spot in the direction of the rotational running of the recording material, said high thermal energy spot being formed on surface of the recording material by the laser beam or a central portion of the laser beam.

The one-stage overwritting method can be done, for instance, by a method which comprises a combination of the operations of:

erasing the recorded information on the recording material by irradiating the recording material under rotation with a laser beam having an energy capable of melting the recording material intermittently at a fixed period shorter than the length of a high thermal energy spot in the direction of the rotational running of the recording material, said high thermal energy spot being formed on the recording material by the laser beam or its central portion; and overwriting information on the recording material by ceasing or stopping the intermittent irradiation of the laser beam or lowering the output power of the laser beam for a period longer than the length of the spot in the direction of the rotational running of the recording material.

In the above erasing or overwriting procedure, a diameter {r(m)} of the laser beam forming the high thermal energy spot preferably is a value satisfying the following formula (1):

$$T < r/2.5 \cdot v \quad (1)$$

wherein T means a period (sec.) and v means a linear velocity (m/sec.).

The high thermal energy spot means a spot which is formed on the recording material by irradiation of a laser beam having such high thermal energy that at least central portion of the laser beam gives to the recording material a thermal energy enough for melting the recording material. The area receiving such high thermal energy is named the high thermal energy spot.

According to the novel two stage method of the invention, the erasing characteristics in terms of unfavorable locallized remaining of the different stable phase after the erasure is extremely reduced, and the recording characteristics are improved in the writing operation after the erasure. Accordingly, employment the overwriting method of the invention is effective to increase the repeatability of the overwriting process.

According to the novel single-stage method of the invention for overwriting information, which comprises writing another information on the recording material under modulation of pulse duration in the course of the erasing procedure, the erasing characteristics in terms of unfavorable locallized remaining of the different stable phase after the erasure is extremely reduced, and the recording characteristics are improved. Accordingly, employment the overwriting method of the invention is very effective to increase the repeatability of the overwriting process.

Further, the erasure of recorded information and the overwriting of information can be carried out based on only the modulation of pulse duration without controlling the laser power by using a single laser beam according to the methods of the invention. The methods have a further advantage that a conventional optical head of DRAW (Direct Read After Write) type can be used. In detail, the laser power used in the invention can comprise only two kinds of power level, that is the level in the erasure and that in the reproduction.

The information recording material employed in the method of overwriting information of the invention can be prepared, for example, by the following process.

The substrate material employed in the invention can be selected from any materials which have been employed as the substrates of the conventional recording media. Examples of the substrate material include glass such as tempered glass, acrylic resins such as cell-cast polymethyl methacrylate: vinyl chloride resins; and polycarbonate resins. The surface of the substrate may be provided with an undercoating layer for the purpose of improving smoothness and adhesion to a recording layer. The substrate may be provided with a pre-groove layer for the purpose of forming a tracking groove or protruded and depressed portions for giving information such as address signals. When a recording layer is self-supporting, the substrate is not always necessary.

On the substrate (or undercoating layer) is then provided a recording layer.

The recording layer comprises a material capable of bringing about change of phase condition (i.e., phase change) depending upon variation of heat treating condition. If necessary, the recording layer includes a light-absorbing material in a dispersed state.

The phase change, for example, includes change between a crystalline phase and an amorphous phase and change between a homogeneous clear phase (i.e., mutually soluble phase) and a phase-separated turbid phase. The temperature of causing reversible change (such as glass transition point for the former change, and cloud point for the latter change) varies depending on kinds of the materials and preferably is in the range of 60° to 400° C., more preferably in the range of 80° to 300° C.

Examples of the material capable of undergoing the change between a crystalline phase and an amorphous phase include metals, semi-metals and compounds thereof such as Sb-Te type, $Sb_2Se$, $TeO_x$ ($0<x<2$), As-Te-Ge type and Sn-Te-Se type. $Sb_{57}Te_{43}$, for example, is in the amorphous (noncrystalline) phase in the form of a film and is altered into the crystalline phase when once it is heated at a temperature not less than the (re)crystallization temperature. $Sb_{57}Te_{43}$ in the crystalline phase reverts to that in the amorphous phase when once it is rapidly cooled after having been heated to a temperature not lower than the melting point. There are employable any other known metals, semi-metals and mixtures thereof capable of undergoing change between a crystalline phase and an amorphous phase.

Examples of the material capable of causing the change between a homogeneous clear phase and a phase-separated turbid phase includes a polymer blend (mixture) comprising specific combinations of two or more polymers. In some cases, a combination of a polymer and a monomer undergoes the same change and such combination is also utilizable. The polymer blend is divided into two types, that is, a polymer blend of lower critical solution temperature (LCST) type and a polymer blend of upper critical solution temperature (UCST) type. The LCST type polymer blend is transparent and in the homogeneous phase at room temperature and is phase-separated at a temperature above the cloud point to turn opaque, while the UCST type polymer blend is opaque and in the phase-separated phase at room temperature and is altered in the homogeneous phase at a temperature above the cloud point to turn transparent.

Examples of the LCST type polymer blend are as follows:

(1) combination of amorphous polymers such as polystyrene and polyvinylmethyl ether, styrene/acrylonitrile copolymer and poly-ε-caprolactone, styrene/acrylonitrile copolymer and polymethyl methacrylate, polyvinyl nitrate and polymethyl methacrylate, ethylene/vinyl acetate copolymer and chlorinated rubber, poly-ε-caprolactone and polycarbonate (bisphenol A type). p-chlorostyrene/o-chlorostyrene copolymer and poly(2,6-dimethyl-1,4-phenyleneoxide), polycarbonate (bisphenol A type) and ethylene oxide block copolymer, butylene terephthalate/tetrahydrofuran block copolymer and polyvinyl chloride, and thermoplastic polyurethane [poly-ε-caprolactone soft block] and polyvinyl chloride;

(2) combination of a crystalline polymer and an amorphous polymer such as polyvinylidene fluoride and polymethyl acrylate, polyvinylidene fluoride and polyethyl acrylate. polyvinylidene fluoride and polymethyl methacrylate, polyvinylidene fluoride and polyethyl methacrylate, and polyvinylidene fluoride and polyvinyl methyl ketone; and (3) combination of a crystalline polymer and a crystalline monomer such as polyethylene oxide and trioxane, and poly-ε-caprolactone and trioxane.

Examples of the UCST type polymer blend include a combination of amorphous polymers such as a combination of polystyrene and polyisoprene, a combination of polystyrene and polyisobutene, a combination of polypropylene oxide and polybutadiene, and a combination of polyisobutene and polydimethyl siloxane.

The above-described polymers can be appropriately copolymerized with other monomers to prepare copolymers, provided that the resulting copolymers are of LCST or UCST.

Examples of the light-absorbing material employable in the invention include dyes such cyanine dyes, metal complex dyes and quinone dyes as well as metals and semimetals. These materials may be employed singly or in combination. The metals or semi-metals may be employed in combination with oxides, halides or sulfides thereof.

When the material capable of causing phase change is an organic compound such as the above-mentioned polymer blend, the recording layer can be formed by the process comprising the steps of dissolving the material and if necessary, the light-absorbing material in an appropriate solvent to prepare a coating solution, applying the coating solution over the surface of the substrate in use of a coating method such as spin coating or roll coating, and drying the coated layer.

In the case of the polymer blend, the polymer blend is used in combination with the light-absorbing material. The ratio between the polymer blend and the light-absorbing material in the coating solution is generally in the range of 100:0.1 to 100:100 (polymer blend:light-absorbing material, by weight), preferably in the range of 100:1 to 100:50. The recording layer can be composed of a single layer or plural layers. The thickness of the recording layer is generally in the range of 0.01 to 10 μm, preferably in the range of 0.02 to 1 μm, from the viewpoint of optical density required for the optical recording.

The light-absorbing material is not necessary to be included in the recording layer and may be included in a layer(s) adjacent thereto (i.e., light-absorbing layer).

In the case that the material capable of undergoing phase change is an inorganic material such as the aforementioned metal, the recording layer can be formed by vapor depositing, sputtering or ion plating the material and if necessary, the light-absorbing material. The recording layer may be composed of a single layer or plural layers. The thickness of the recording layer is generally in the range of 100 to 1,500 angstroms, preferably in the range of 150 to 1,000 angstroms, from the viewpoint of optical density required for the optical recording.

A reflecting layer composed of a metal such as Al, Cr or Ni may be provided on the recording layer (or light-absorbing layer) or between the substrate (or light-absorbing layer) and the recording layer to increase S/N ratio in the reproducing procedure and to enhance sensitivity in the recording procedure. A protective layer composed of an inorganic material such as $SiO_2$, $MgF_2$ or $SnO_2$, or an organic material such as UV-curable resin may be further provided on the recording layer (or light-absorbing layer) to physically or chemically protect the recording layer.

The method of erasing a recorded information from an recording material and overwriting another information thereon according to the invention are described hereinafter after referring to a typical recording material which is a material being changeablve between a crystalline phase and an amorphous phase.

Initiallization, recording (writing), reproduction and erasure of information are carried out by using a semiconductor laser capablve of giving near infrared rays such as Ga-As laser. A laser beam converged by a known method is irradiated on the surface of the recording material.

It is desired to initiallize the recording material prior to recording of information. The initiallization is preferably carried out in the same condition as that of the erasure described below. It is possible to omit the initiallizing procedure in the invention.

Optical recording of information, for example, recording information on the recording material is carried out by partially changing the recording material in a crystalline phase to that in an amorphous phase under irradiation of the laser beam. Reproduction of the information is carried out based on the difference of the optical characteristics between the amorphous areas and the crystalline areas. The erasing of a recorded information is carried out by crystallizing the recording material by use of a laser beam of power lower than that in the recording procedure.

When the laser beam of high power is irradiated in the recording procedure, as afore-described, the recrystallized part 2 is produced around the amorphous part 1. The recrystallized area 2 is different in the crystalline conditions (e.g. particle size of crystal) from the original crystalline area S which has been scanned using the laser beam of low power.

Figure 3:
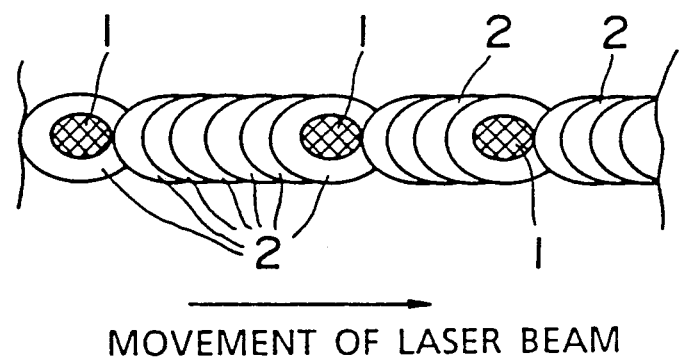
FIG. 3 is a schematic view showing a recorded state on a surface of a recording material medium on which information is recorded according to the invention.
Figure 4:
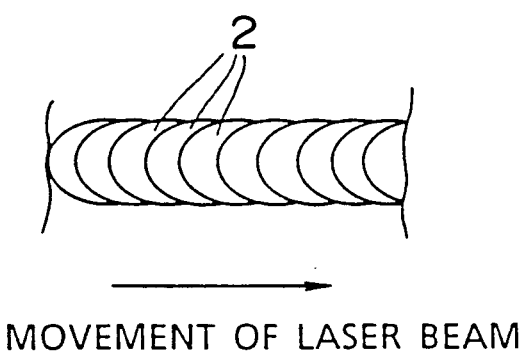
FIG. 4 is a schematic view showing an erased state on a surface of a recording material from which recorded information is erased according to the invention.

In the invention, the recrystallized phase can be removed by the following erasing operation. In detail, in the erasing operaton, the recording material is irradiated with a laser beam having a thermal energy capable of recording information (i.e., capable of heating the material of the recording layer to a temperature not lower than the melting point) intermittently in such a manner that a spot of the laser beam on the recording medium is partially superposed on the precedingly formed spot having such high thermal energy, as shown in FIG. 3. Therefore, an amorphous area part 1 produced by the preceding spot is changed to a recrystallized area 2 by the power of the subsequent spot. By continuing such irradiation, a series of the recrystallized areas 2 are formed so that an area composed of the recrystallized areas 2 and in a uniform condition is obtained (see FIG. 4).

Recording (writing) of information is carried out by stopping the irradiation of the laser beam which is done intermittently (i.e., light pulse) for a period longer than the time in which the laser beam is passed through the length of the spot having the high thermal energy. That is, the recording layer is irradiated with the laser beam at such a long irradiation period that the amorphous area 1 is not melted.

Even if cessation of irradiaion of the light pulse, the recording layer is irradiated with a laser beam for the reproduction which plays the important role in a tracking servo and a focussing servo.

In other words, erasing of information in the method of the invention is carried out by irradiating the rotating recording material with a laser beam intermittently, wherein the irradiation period thereof should be shorter than the time in which the laser beam is passed through the length of the spot having a high thermal energy in the direction of the running of the recording medium, said spot being formed on the recording material by the high thermal energy portion of laser beam. Overwriting of information is carried out by writing another information at the same time as erasing, in which the rotating recording material is intermittently irradiated with the laser beam in the same manner as that in the erasing method while the irradiation of the laser beam is sometimes stopped for a period longer than the time in which the laser beam is passed through the length of the high thermal energy spot in the direction of the running of the recording material.

The laser power used in the invention comprises two kinds of power level, that is the level in the erasure and that in the reproduction. The power level in the recording is the same as that in the reproduction. In both the erasure and the recording, the laser beam for reproducing is generated in the form of a continuous beam. Accordingly, the erasure of the information utilizes both the continuous beam and the intermittent beam (i.e., light pulse), while in the recording of the information, only the continuous beam remains owing to the cessation of the light pulse. Therefore, the recording of the information results in the use of only the continuous beam. The overwriting of information can be conducted by the combination of these procedures. The continuous beam is generated by the same single laser beam as the light pulse. The overwriting may be carried out by prolonging the pulse duration or lowering the power in the last light pulse of a series of pulses in the erasure, thereby, the overwritten signal is improved in accuracy as the case may be.

The recording material from which a recorded information is erased according to the method of the invention is recorded reliably according to the conventional method by controlling the pulse duration of irradiation suitably, so that the conventional recording method can be employed in combination with the erasing method of the invention.

In the methods of erasing and overwriting of the invention, the erasing is done by irradiating the recording material with a laser beam having a thermal energy capable of recording information (i.e., capable of heating the recording material to a temperature not lower than the melting point) in such a manner that a high thermal energy spot of the laser beam thereon is partially superposed upon the corresponding spot which has been formed in the preceding irradiation. Writing is done by stopping the intermittent irradiation of the laser beam for a period longer than the time in which the laser beam is passed through the length of the high thermal energy spot. Accordingly, it is desired that the superposed part of two spots is as large as possible from the viewpoint of keeping the continuity of the erased area. The diameter {r(m)} of the laser beam forming the spot is preferably a value satisfying the following formula (1):

$$T < r/2.5 < v \quad (a)$$

wherein T means a period (sec.) and v means a linear velocity (m/sec.).

Further, a single beam can be used and only two kinds of laser power comprising higher one and power O are employed in the invention, so that it is not required to control the laser power. Therefore, the erasure of recorded information and the overwriting of information can be performed only by modulating the pulse number and it is advantageous that the conventional optical head of DRAW type can be used. A laser drive circuit can be simplified since the overwriting can be done only by the control of pulse number (period of pulse).

It should be understood that the information recording material employed for the methods of erasing information and overwriting information of the invention is by no means restricted to the aforementioned one, and the methods can be applied upon any other recording material utilizing another phase change such as that of the polymer blend.

Further, the overwring method can be utilized in the case of a recording material in other forms, such as, an optical card.

Examples of the present invention and comparison exampleson are given below.

EXAMPLE 1

On a disc-shaped substrate of cell-cast polymethyl methacrylate resin provided with a tracking guide (outer diameter: 130 mm, inner diameter: 15 mm, thickness: 1.2 mm, track pitch: 1.6 μm) was vapor-deposited ZnS to form a light-absorbing layer of 800 angstroms thick. Sb and Te were vapor-deposited altogether on the light-absorbing layer in the ratio of 52:48 (Sb:Te, in number of atoms) to form a recording layer comprising $Sb_{52}Te_{48}$ in the thickness of 800 angstroms. Further ZnS was vapordeposited on the recording layer to form a light-absorbing layer of 800 angstroms thick. Thus, an information recording medium was prepared.

The whole surface of the obtained recording medium was then irradiated with a semiconductor laser beam modulated at a high frequency (wavelength: 830 nm, light power: 12 mW, frequency: 10 MHz, pulse duration: 50 ns) at the linear velocity of 5 m/sec. to initiallize the medium. The recording medium was irradiated on the substrate side with a usual semiconductor laser beam (wavelength: 830 nm, light power: 7 mW, frequency: 2.5 MHz, pulse duration: 200 ns) at the linear velocity of 5 m/sec. to write information. Subsequently, the recorded information was erased from the recording medium in the same manner as that of the initiallization.

EXAMPLE 2

The information recording medium obtained in Example 1 on which the information was recorded was, without erasing the information, irradiated with a semiconductor laser beam modulated at a high frequency (wavelength: 830 nm, frequency: 10 MHz, pulse duration: 50 ns) at the linear velocity of 5 m/sec. in such a manner that the alternate irradiation with said laser beam at the light power of 12 mW and irradiation at the light power of 0.8 mW (the laser beam for reproduction) was repeated every 200 ns, to overwrite information.

COMPARISON EXAMPLE 1

A whole surface of an information recording medium prepared in the same manner as described in Example 1 was irradiated on the substrate side with a semiconductor laser beam having DC signals (wavelength: 830 nm, light power: 5 mW) at the linear velocity of 5 m/sec. to initiallize the medium. The recording medium was irradiated on the substrate side with a semiconductor laser beam (wavelength: 830 nm, light power: 10 mW, frequency: 2.5 MHz, pulse duration: 200 ns) at the linear velocity of 5 m/sec. to write information. Subsequently, the recorded information was erased from the recording medium in the same manner as that of the initiallization.

COMPARISON EXAMPLE 2

A whole surface of an information recording medium prepared in the same manner as described in Example 1 was irradiated on the substrate side with a semiconductor laser beam having DC signals (wavelength: 830 nm, light power: 10 mW) at the linear velocity of 5 m/sec. to initiallize the medium. The recording medium was irradiated on the substrate side with a semiconductor laser beam (wavelength: 830 nm, light power: 5 mW, frequency: 2.5 MHz, pulse duration: 200 ns) at the linear velocity of 5 m/sec. to write information. Subsequently, the recorded information was erased from the recording medium in the same manner as that of the initiallization.

The information recording media of Examples and Comparison Examples were evaluated on the C/N (carrier to noise) ratios in the recording and the erasure and the number of overwrite (or number of repeating recording and erasure) according to the following tests.

(1) C/N ratio in recording

The signals recorded on the recording medium were reproduced therefrom and the C/N ratio of the reproduced signals was measured using a Nakamichi Disc Evaluating Device (OMS-1000, available from Nakamichi Co., Ltd.).

(2) C/N ratio in erasure

The signals remained in the recording medium after the erasing procedure were reproduced therefrom and the C/N ratio of the reproduced signals was measured using the Nakamichi Disc Evaluating Device.

(3) Number of overwrite (Number of repeating recording and erasure)

The overwrite (or recording and erasure) was repeated and the number in which a constant jitter could be kept was measured using the Nakamichi Disc Evaluating Device.

The results are set forth in Table 1.

TABLE 1

|  | C/N Ratio in Recording (dB) | C/N Ratio in Erasure (dB) | Repeated Number (times) |
| --- | --- | --- | --- |
| Example 1 | 47 | 10 | not less than 100 |
| Example 2 | 45 | — | not less than 100 |
| Com. Example 1 | 45 | 31 | 5 |
| Com. Example 2 | 43 | 23 | 2 |

As is evident from the results shown in Table 1, the information recording medium (Example 1) having been subjected to the writing and erasing procedures according to the method of the invention showed satisfactory erasing characteristics and satisfactory durability in repeated use. Further, it was confirmed from the results of Example 2 that the method of the invention enables to overwrite information on the recording medium, that is, enables to rewrite without erasing, even using the conventional optical head of DRAW type as such and only modulating the pulse number.

On the contrary, the recording media (Comparison Examples 1 and 2) having been subjected to the writing and erasing procedures according to the conventional method showed practically insufficient erasing characteristics and durability in the repeated use.

What is claimed is:

1. A method of optically writing an information over an information recorded on a recording material which is reversively convertible between a stable phase and a metastable phase to show different light reflection or transmission by controlling a heating condition to be applied to the recording material, said recorded information being recorded in the form of a plurality of separated areas of the metastable phase in the recording material of the stable phase which comprises the steps of:

intermittently irradiating the plurality of separated areas of metastable phase of the recording material with a laser beam which gives such a high thermal energy to the recording material at least at its central area of a beam spot formed on the recording material as to be able to convert the metastable phase into the stable phase under the condition that the central area of one beam spot is formed on the recording material in an area overlapping with an area of a central high thermal energy area of a laser beam spot having been formed by the preceding irradiation to form a series of the stable phases by converting the metastable phase into the stable phase, whereby the recorded information is erased; and subsequently recording another information in the recording material by irradiating the recording material with a laser beam to form a plurality of separated areas of the metastable phase in the recording material.

2. The method as claimed in claim 1, wherein the laser beam used in the step of recording another information is emitted by a source of the laser beam used in the step of erasing information.

3. The method as claimed in claim 1, wherein the laser beam used in the step of recording another information has the same thermal energy as the laser beam used in the step of erasing information.

4. The method as claimed in claim 1, wherein the stable phase is a crystalline phase and the metastable phase is an amorphous phase.

5. A method of optically writing an information over an information recorded on a recording material which is reversively convertible between a stable phase and a metastable phase to show different light reflection or transmission by controlling a heating condition to be applied to the recording material, said recorded information being recorded in the form of a plurality of separated areas of the metastable phase in the recording material of the stable phase which comprises a combination of a process for continuously erasing the recorded information and stages for writing another information on the recording material, said writing stage being executed in the course of the erasing process the, wherein:

said erasing process comprises intermittently irradiating the plurality of separated areas of metastable phase of the recording material with a laser beam which gives such a high thermal energy to the recording material at least at its central area of a beam spot formed on the recording material as to be able to convert the metastable phase into the stable phase under the condition that the central area of one beam spot is formed on the recording material in an area overlapping with an area of a central high thermal energy area of a laser beam spot having been formed by the preceding irradiation to form a series of the stable phases by converting the metastable phase into the stable phase, whereby the recorded information is erased; and said writing stage comprises intermittently irradiating the recording layer with said laser beam under the condition that the central area of one beam spot is formed on the recording material in an area not overlapping with an area of a central high thermal energy area of a laser beam having been formed by the preceding irradiation to form the metastable phase in the recording material.

6. The method as claimed in claim 5, wherein the stable phase is a crystalline phase and the metastable phase is an amorphous phase.

* * * * *